United States Patent
Fujino et al.

(10) Patent No.: US 9,919,789 B2
(45) Date of Patent: *Mar. 20, 2018

(54) WINDOW OF AN AIRCRAFT (71) Applicant: Honda Patents & Technologies North America, LLC, Torrance, CA (US)

(72) Inventors: Michimasa Fujino, Summerfield, NC (US); Yasuhiro Homma, Greensboro, NC (US)

(73) Assignee: Honda Patents & Technologies North America, LLC, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/401,689

(22) Filed: Jan. 9, 2017

(65) Prior Publication Data
US 2017/0121007 A1 May 4, 2017

Related U.S. Application Data (63) Continuation of application No. 14/274,825, filed on May 12, 2014, now Pat. No. 9,561,853.
(Continued)

(51) Int. Cl.
*B64C 1/14* (2006.01)
*B64D 11/02* (2006.01)

(52) U.S. Cl.
CPC .......... *B64C 1/1484* (2013.01); *B64C 1/1492* (2013.01); *B64D 11/02* (2013.01)

(58) Field of Classification Search
CPC ...... B64C 1/1484; B64C 1/1476; B64D 11/02
(Continued)

(56) References Cited

U.S. PATENT DOCUMENTS 4,364,533 A * 12/1982 Pompei ................ B64C 1/1484
244/129.3
4,541,595 A 9/1985 Fiala et al.
(Continued)

FOREIGN PATENT DOCUMENTS

CA       2481464 A1 * 10/2003  ........... B64C 1/1484
CN     101580121        11/2009
(Continued)

OTHER PUBLICATIONS

Extended European Search Report of European Application No. 14 797 229.3 dated Jan. 31, 2017, 10 pages.
(Continued)

*Primary Examiner* — Christopher P Ellis
*Assistant Examiner* — Magdalena Topolski
(74) *Attorney, Agent, or Firm* — Rankin, Hill & Clark LLP (57) ABSTRACT

An aircraft includes a fuselage including a plurality of frame members disposed at predetermined intervals in a longitudinal direction of the fuselage and a plurality of stringers extending substantially linearly in the longitudinal direction. The fuselage defines an aircraft interior. A compartment is located in the interior of the fuselage. The compartment defines an interior area. A first window assembly is mounted to an upper portion of the fuselage for introducing daylight into the interior area. The first window assembly is flanked by adjacent frame members of the plurality of frame members and adjacent stringers of the plurality of stringers. The first window assembly includes a window pane, an inner cover and a retainer. The inner cover introduces daylight from the window pane into the interior area. The retainer secures the window pane and the inner cover to the fuselage.

18 Claims, 12 Drawing Sheets

Related U.S. Application Data (60) Provisional application No. 61/824,463, filed on May 17, 2013.

(58) Field of Classification Search
USPC .......................................................... 296/215
See application file for complete search history.

(56) References Cited

U.S. PATENT DOCUMENTS

| | | | |
|---|---|---|---|
| 4,923,244 A * | 5/1990 | Clenet | B60J 7/0038 |
| | | | 160/37 |
| D363,773 S | 10/1995 | Nishizawa | |
| 6,082,674 A | 7/2000 | White et al. | |
| 6,227,491 B1 | 5/2001 | Stephan et al. | |
| D455,390 S | 4/2002 | Granzeier et al. | |
| D512,365 S | 12/2005 | Bladt et al. | |
| 7,118,069 B2 | 10/2006 | Novak | |
| D536,436 S | 2/2007 | Nishizawa | |
| D562,779 S | 2/2008 | Lamoree et al. | |
| 7,530,531 B2 | 5/2009 | Wood et al. | |
| D600,623 S | 9/2009 | Fiedler et al. | |
| D600,624 S | 9/2009 | Fiedler et al. | |
| D611,888 S | 3/2010 | Bladt et al. | |
| D617,254 S | 6/2010 | Guard et al. | |
| D626,491 S | 11/2010 | Saint-James et al. | |
| D631,421 S | 1/2011 | Kosoniscs et al. | |
| 8,042,769 B2 | 10/2011 | Steiner | |
| D654,008 S | 2/2012 | Stevens | |
| D673,892 S | 1/2013 | Stephan et al. | |
| D687,366 S | 8/2013 | Fujino et al. | |
| 2003/0098595 A1 * | 5/2003 | Carter | B32B 17/10036 |
| | | | 296/146.15 |
| 2005/0044712 A1 | 3/2005 | Gideon et al. | |
| 2005/0200934 A1 * | 9/2005 | Callahan | B64C 1/1484 |
| | | | 359/265 |
| 2005/0230550 A1 * | 10/2005 | Dominguez | B64C 1/1469 |
| | | | 244/129.5 |
| 2005/0268567 A1 | 12/2005 | Devine | |
| 2006/0118676 A1 | 6/2006 | Novak et al. | |
| 2008/0042012 A1 | 2/2008 | Callahan et al. | |
| 2008/0055731 A1 | 3/2008 | Boston et al. | |
| 2008/0190568 A1 * | 8/2008 | Schwarz | E06B 9/24 |
| | | | 160/84.06 |
| 2009/0241424 A1 | 10/2009 | Mohat | |
| 2011/0297333 A1 | 12/2011 | Sievers et al. | |
| 2012/0261509 A1 | 10/2012 | Grant | |
| 2013/0087293 A1 | 4/2013 | Fillmore | |
| 2014/0165285 A1 | 6/2014 | Durand | |
| 2014/0175218 A1 | 6/2014 | Gallant | |

FOREIGN PATENT DOCUMENTS

| | | |
|---|---|---|
| EP | 2447150 | 5/2012 |
| EP | 2664542 | 11/2013 |
| EP | 2842865 | 3/2015 |

OTHER PUBLICATIONS

International Search Report and Written Opinion of PCT/US2014/037958 dated Nov. 13, 2014, 12 pages.
Article: George, F.: "Gulfstream 280", Aviation Week: Business & Commercial Aviation, Nov. 2012, 12 pages.

* cited by examiner

WINDOW OF AN AIRCRAFT

PRIORITY STATEMENT

This application is a continuation of U.S. application Ser. No. 14/274,825 filed on May 12, 2014, which claims priority to U.S. Provisional Application Ser. No. 61/824,463 filed on May 17, 2013, both of which are expressly incorporated herein by reference.

BACKGROUND

In general, aircrafts are not provided with a lavatory window. For example, large size aircrafts do not have a window located in the lavatory because the lavatory is typically a closed small chamber in its cabin area to preserve a passenger's privacy. Various kinds of lights are used in an airplane lavatory; however, the lavatory is oftentimes underlit and such a small enclosed space with artificial lighting can make a passenger feel very cramped. On the other hand, providing a large sized window in an airplane lavatory can make it difficult to maintain the strength of the aircraft's fuselage structure and to preserve passenger's privacy. In addition, a lavatory having a large sized window has a disadvantage in terms of weight of aircraft, because the window pane is heavier than material of the aircraft fuselage. For that reason, an aircraft does not have a window in a lavatory in general. Further, direct daylight and deep shadows created by the direct daylight though a large size window can also provide an uncomfortable feeling to the passenger.

BRIEF DESCRIPTION

In accordance with one aspect, an aircraft comprises a fuselage including a plurality of frame members disposed at predetermined intervals in a longitudinal direction of the fuselage and a plurality of stringers extending substantially linearly in the longitudinal direction. The fuselage defines an aircraft interior. A compartment is located in the interior of the fuselage. The compartment defines an interior area. A first window assembly is mounted to an upper portion of the fuselage for introducing daylight downwardly through a ceiling panel and into the interior area. The first window assembly is flanked by adjacent frame members of the plurality of frame members and adjacent stringers of the plurality of stringers. The first window assembly includes a first window pane, a first inner cover and a first retainer. The first inner cover introduces the daylight from the first window pane into the interior area. The first retainer secures the first window pane and the first inner cover to the fuselage. A second window assembly is mounted to the upper portion of the fuselage opposite the first window assembly for introducing daylight downwardly through the ceiling panel and into the interior area. The second window assembly is flanked by adjacent frame members of the plurality of frame members and adjacent stringers of the plurality of stringers. The second window assembly includes a second window pane, a second inner cover and a second retainer. The interior area defines a lateral centerline and a vertical centerline. An intersection of the lateral and vertical centerlines defines a center point of the interior area. The first window assembly and the second window assembly are each angularly offset through the center point relative to the vertical centerline from a 0 degree position to a 60 degree position.

In accordance with another aspect, an aircraft comprises a fuselage including a plurality of frame members disposed at predetermined intervals in a longitudinal direction of the fuselage and a plurality of stringers extending substantially linearly in the longitudinal direction. The fuselage defines an interior. A compartment is located in the interior of the fuselage and defines an interior area. A first window assembly is mounted to an upper portion of the fuselage of introducing daylight downwardly through a ceiling panel and into the interior area. The first window assembly is flanked by adjacent frame members of the plurality of frame members and adjacent stringers of the plurality of stringers. The first window assembly includes a first window pane, a first inner cover and a first retainer. The first inner cover introduces the daylight from the first window pane into the interior area. The first retainer secures the first window pane and the first inner cover to the fuselage. The interior area is a lavatory space including a toilet. The toilet defines a centerline extending in a lateral direction of the fuselage. The first window assembly is mounted to an opposite side of the toilet and is linearly offset in a direction along the longitudinal centerline from the toilet centerline. The interior area defines a lateral centerline and a vertical centerline. An intersection of the lateral and vertical centerlines defines a center point of the interior area. The first window assembly is angularly offset through the center point relative to the vertical centerline from a 0 degree position to a 60 degree position.

DETAILED DESCRIPTION

It should, of course, be understood that the description and drawings herein are merely illustrative and that various modifications and changes can be made in the structures disclosed without departing from the present disclosure. In general, the figures of the exemplary aircraft are not to scale. It will also be appreciated that the various identified components of the aircraft are merely terms of art that may vary from one manufacturer to another and should not be deemed to limit the present disclosure. As used herein, lateral directions are transverse across the aircraft, i.e., left and right directions. Likewise, longitudinal directions refer to forward and rearward directions of aircraft travel, and the vertical directions relate to elevation, i.e., upward and downward directions.

Referring now to the drawings, wherein like numerals refer to like parts throughout the several views, FIGS. 1-4 illustrate an aircraft 100 according to the present disclosure. The aircraft 100 includes a main wing 102 attached to a fuselage 104 and a tail assembly 106. The aircraft 100 has two turbofan engines 110 mounted on pylons 112 secured to respective upper surfaces of left-half and right-half wings 114, 116 of the main wing 102. The fuselage 104 includes a nose section 120, a cabin section 122, and an aft section 124. The cabin section 122 has passenger windows 126 which provide a good range of view through a limited window area. A nose landing gear unit (not shown) is mounted on a lower region of the nose section 120, and a pair of main landing gear units (not shown) is mounted on a lower region of the main wings 102. The tail assembly 106 comprises a relatively large vertical tail 130 attached to the aft section 124 of the fuselage 104 and a horizontal tail 132 attached to an upper portion of the vertical tail 130.

Figure 10:
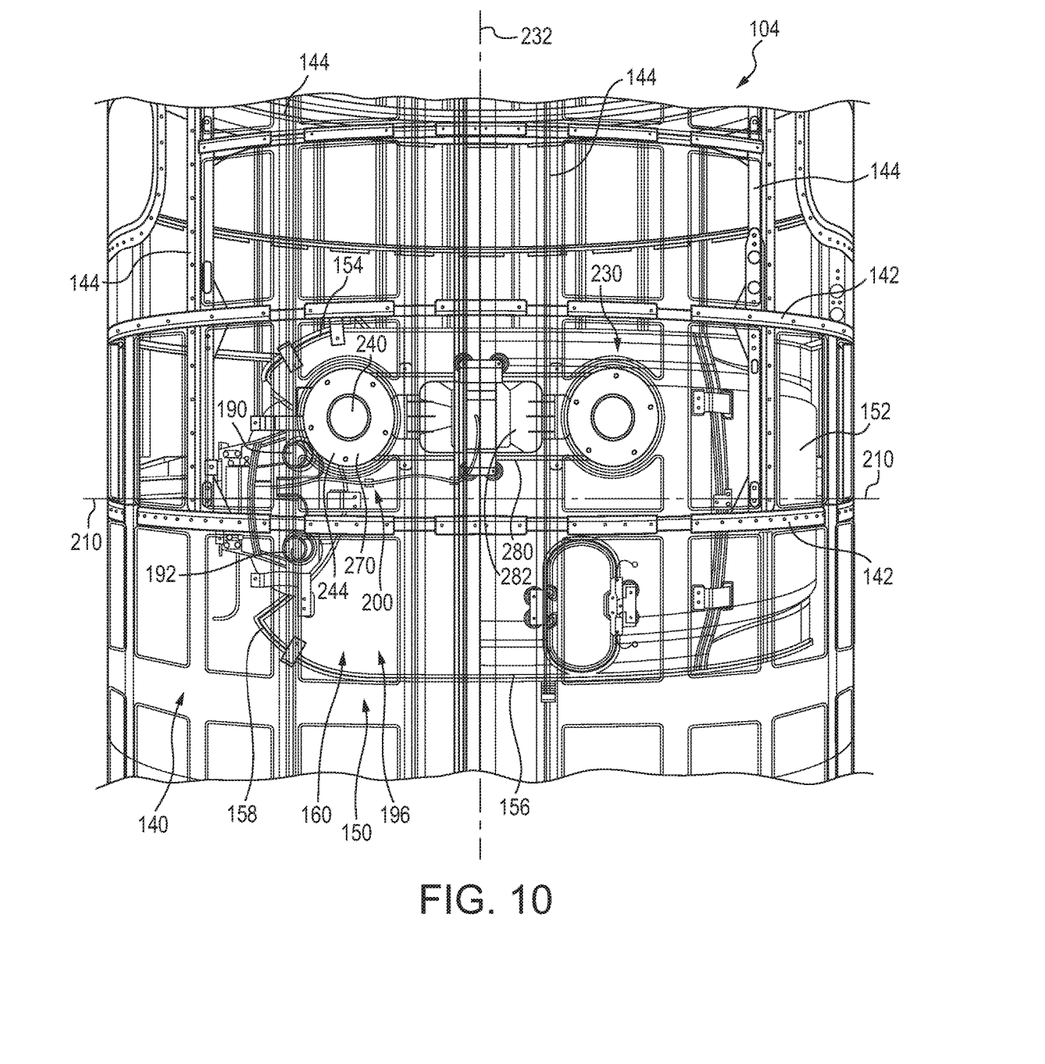
FIG. 10 is a top plan view of a portion of the fuselage with an outer skin of the fuselage removed.
Figure 12:
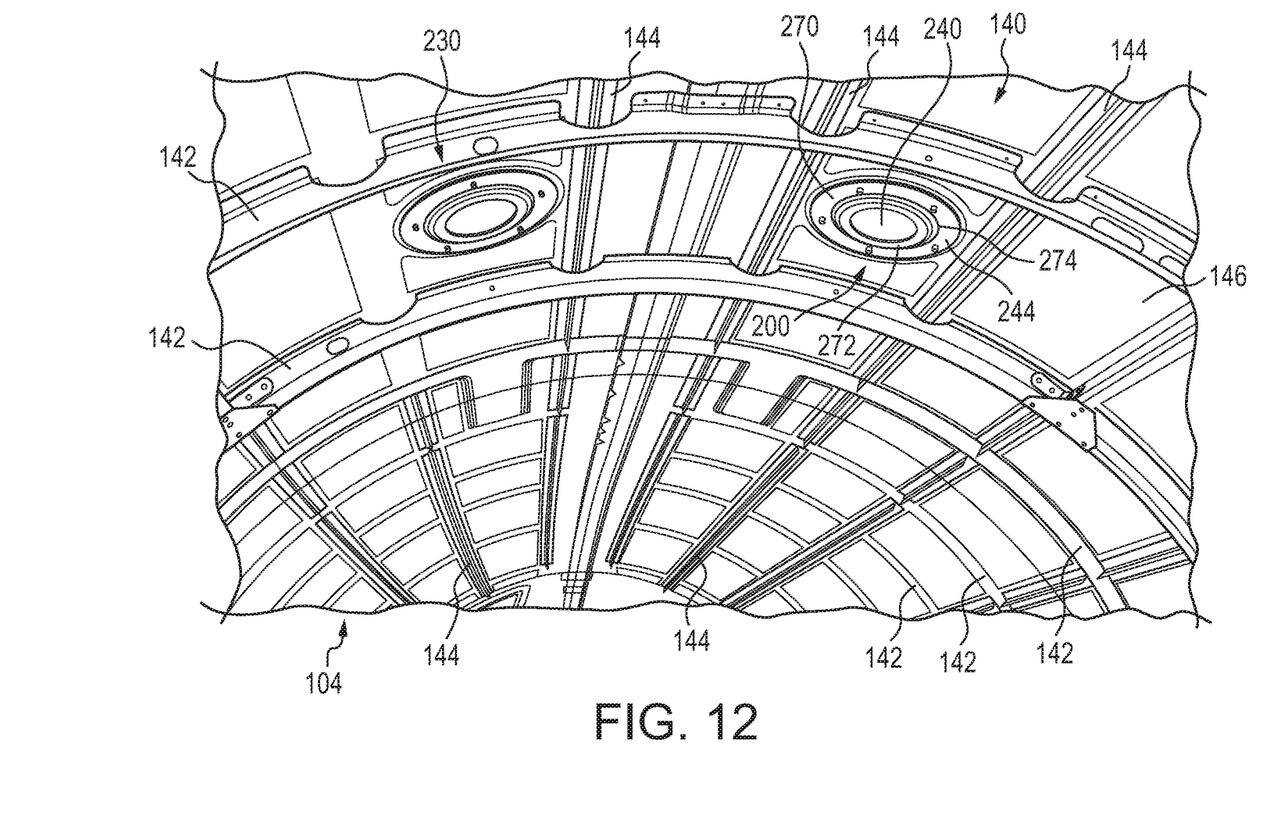
FIG. 12 is a bottom perspective view of the fuselage showing the pair of exemplary window assemblies mounted thereto.

As shown in FIGS. 10 and 12, a frame assembly 140 of the fuselage 104 is constructed by combining a plurality of generally ring-shaped frame members 142 with a plurality of stringers 144. Each of the frame members 142 forms an annular shape, and the frame members are disposed at predetermined intervals in a longitudinal direction of the fuselage 104. The stringers 144 extend substantially linearly in the longitudinal direction of the fuselage 104 and intersect the frame members 142. The plurality of frame members 142 can decrease in diameter in accordance with the closeness thereof to the aft section 124 of the fuselage 104. The frame members 142 and stringers 144 support an outer skin 146 (FIG. 12) of the fuselage 104.

Figure 8:
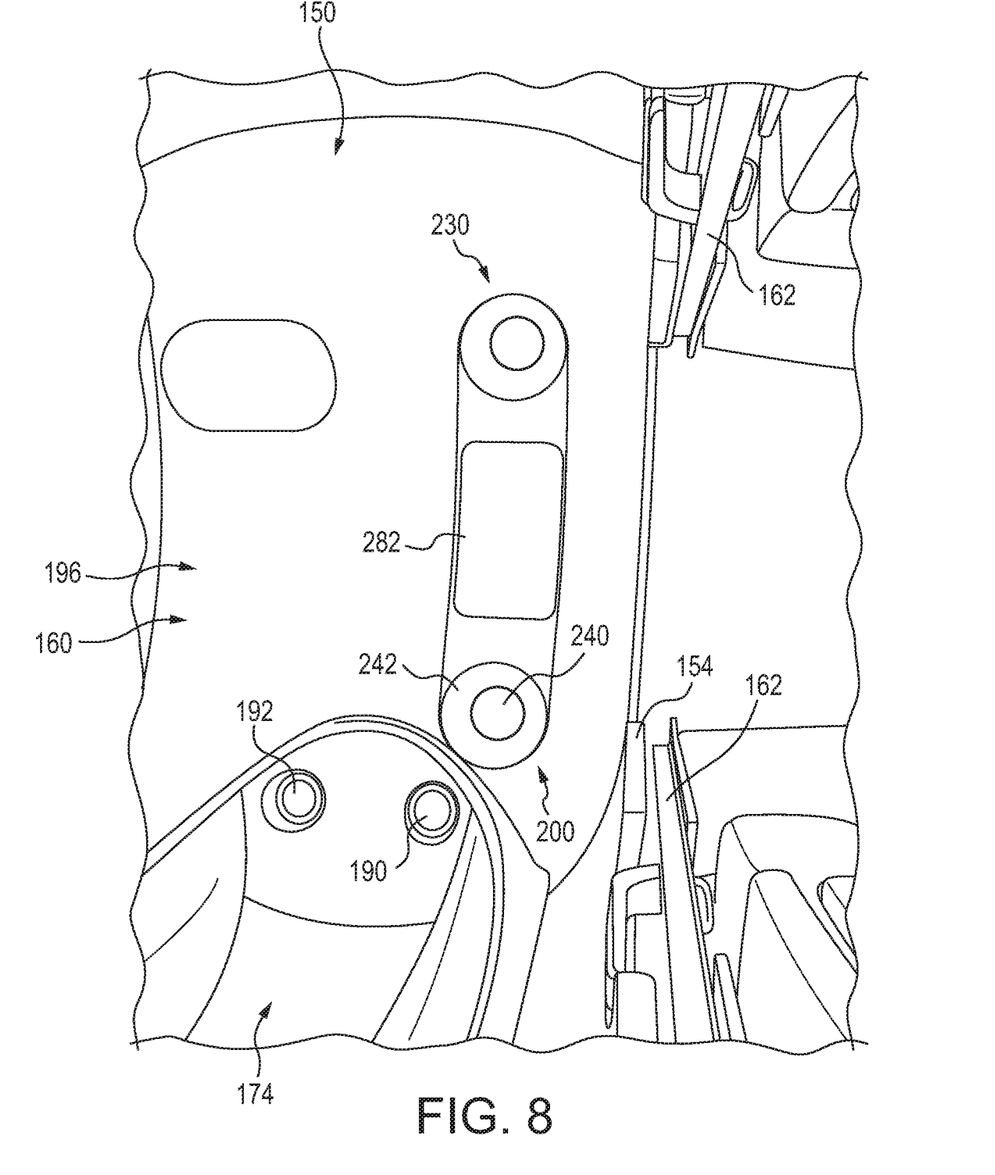
FIG. 8 is a bottom plan view of a lavatory area defined by the lavatory and showing the pair of exemplary window assemblies.
Figure 9:
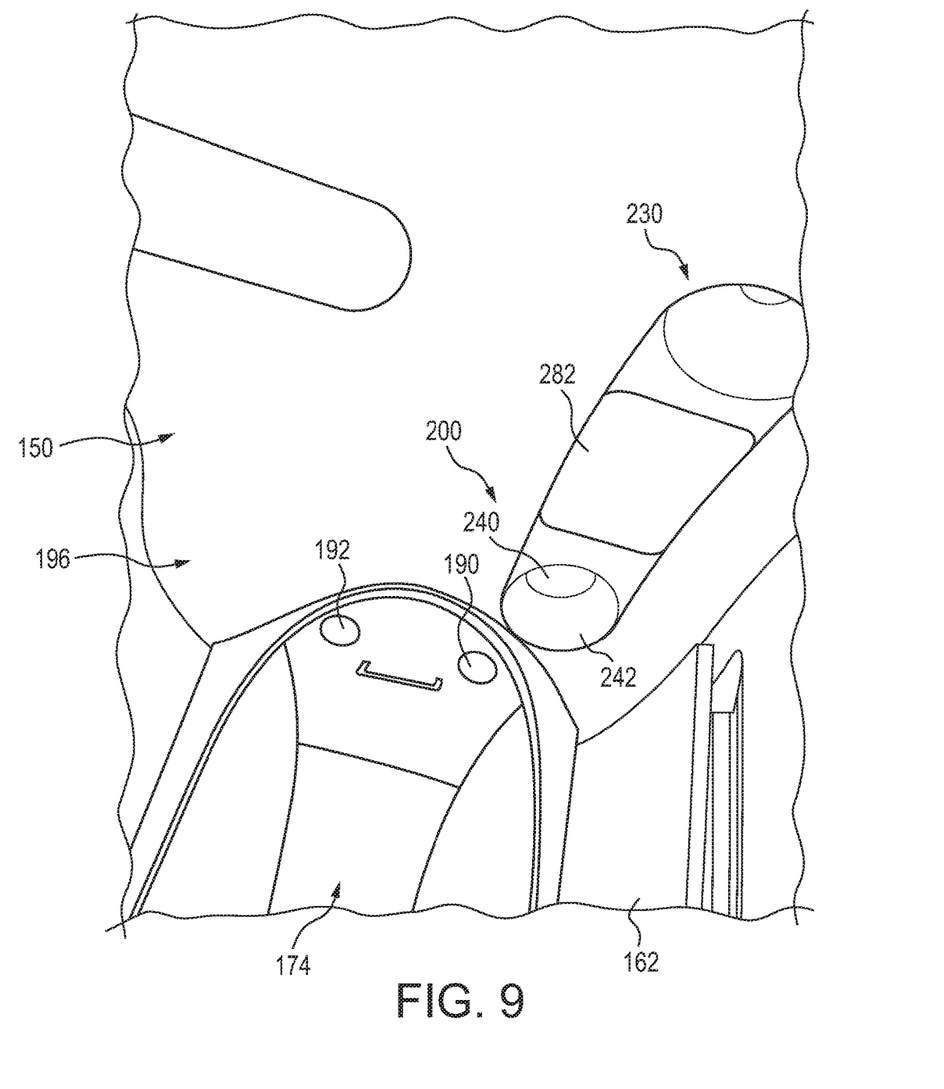
FIG. 9 is a perspective view of the lavatory area of FIG. 8
Figure 13:
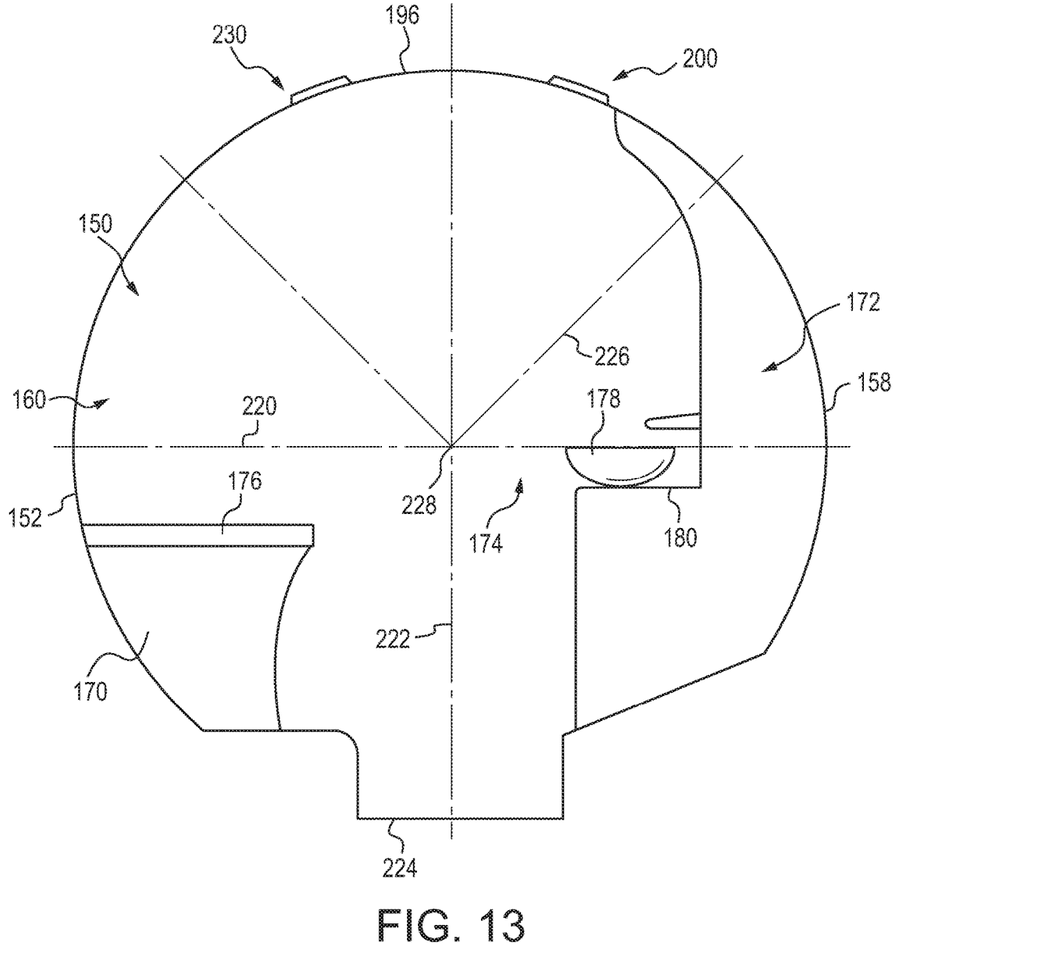
FIGS. 13 and 14 are schematic views of the lavatory area of the lavatory showing the positioning of the pair of exemplary window assemblies.

With reference now to FIGS. 8-11, an interior or cabin of the aircraft 100 further includes a lavatory 150 positioned aft of the rear-most passenger seats within the aircraft interior. The lavatory 150 is one of the compartments of the fuselage 104. It is noted that the positioning of the lavatory 150 within the aircraft interior is only intended to be illustrative of one possible arrangement within the aircraft interior. As best shown in FIG. 10, the lavatory 150 is defined by four walls, namely a side wall 152 of the fuselage 104, a fore wall 154, an aft wall 156 and an interior wall 158. It should be appreciated that the naming of the four walls is intended merely to provide a context understandable with respect to the aircraft interior and is not intended to be limiting of the present disclosure. At least one side-sliding type door 162 located on the fore wall 154 provides access to an interior space of the lavatory 150. The interior space of the lavatory 150 is referred to herein as the lavatory area 160. With additional reference to FIG. 13, the lavatory 150 includes a toilet 170 and a vanity 172 provided in a vanity area 174 of the lavatory area 160. In the illustrated embodiment, the side wall 152 is the inner wall of the lavatory 150 located at the toilet side, and the interior wall 158 of the lavatory 150 is located at the vanity side. The toilet 170 includes a toilet seat 176 and is positioned along the side fuselage wall 152. The vanity 172 is positioned along the interior wall 158 and includes a sink 178 mounted on a countertop 180. A pair of spaced task lights 190, 192 is mounted to a ceiling panel 196 (FIGS. 8-10). It should also be appreciated that the placement of the amenities within the lavatory 150 described above may be changed to accommodate the position of the lavatory within the aircraft interior.

In accordance with the present disclosure, a first window assembly 200 is mounted to an upper portion of the fuselage 104 for introducing daylight downwardly into the lavatory area 160. This location of the first window assembly 200 makes it easy to fill the lavatory area 160 with bright natural light and to preserve passenger privacy even if the aircraft 100 is on the apron. As shown, the first window assembly 200 is flanked by adjacent frame members of the plurality of frame members 142 and adjacent stringers of the plurality of stringers 144. Therefore, the structure and installation of the first window assembly 200 in the ceiling panel 196 is not complicated and does not affect the structural strength of the fuselage 104. As indicated above, the toilet 170 is located in the lavatory area 160 of the lavatory 150. As depicted in FIG. 10, a centerline 210 shows the centerline of the toilet 170 to a lateral direction of the fuselage 104. The first window assembly 200 is linearly offset from the toilet centerline 210. In the depicted embodiment, the first window assembly 200 is offset forwardly of the centerline 210 toward the fore wall 154. This positioning of the first window 200 relative to the toilet centerline 210 ensures that the daylight introduced into the lavatory area 160 by the first window assembly 200 is not likely to be obscured by a passenger sitting on the toilet 170 or a passenger using a vanity 172.

Furthermore, and with reference back to FIG. 13, the lavatory area 160 defines a lateral centerline 220 and a vertical centerline 222. More particularly, the lateral centerline 220 is defined as the midpoint between a floor 224 of the lavatory 150 and the uppermost part of the fuselage 104. The vertical centerline 222 is defined as the midpoint between the side wall 152 and the interior wall 158. An intersection of the lateral and vertical centerlines 220, 222 defines a center point 228 of the lavatory area 160. According to an aspect of the present disclosure, the first window assembly 200 is angularly offset through the center point 228 relative to the vertical centerline 222 from a 0 degree position to approximately a 45 degree position (shown by the dash-dot line 226). This angular position of the first window assembly 200 relative to the center point 228 reduces the possibility of the daylight introduced into the lavatory area 160 being obscured by a passenger and by the amenities and other equipment in the lavatory 150. For example, a lower angular position of the first window 200 (i.e., an angular offset that exceeds the 45 degree position) can provide direct uncomfortable glare daylight to the passenger and can create deep shadows in the lavatory area 160. The glare light and the deep shadows can make it difficult for the passenger to see something in the lavatory area 160. The upper portion of the fuselage 104 means any portion from the 0 degree position to an approximately 60 degree position.

As shown in figures of the present disclosure, the aircraft 100 can further include a second window assembly 230. The second window assembly 230 can be longitudinally aligned on the fuselage 104 with the first window assembly 200. Further, the first window assembly 200 can laterally spaced a predetermined distance from and on one side of a longitudinal centerline 232 of the fuselage 104 (FIG. 10). The second window assembly 230 is also flanked by adjacent frame members of the plurality of frame members 142 and adjacent stringers of the plurality of stringers 144 as well as the first window assembly 200. The second window assembly 230 is located at the symmetric position of the first window assembly 200. With the first and second window assemblies 200, 230 at the upper portion of the fuselage 104, enough daylight can be introduced evenly into the lavatory area 160 and the possibility of the daylight being obstructed and the deep shadows, glare daylight to passengers are reduced. In addition, this structure secures passenger privacy even if the aircraft 100 is on the apron. Regardless of the position of the sun and attitude of the aircraft 100, this structure enables to introduce daylight because the first and second window assemblies 200, 230 are of symmetrical design.

Figure 14:
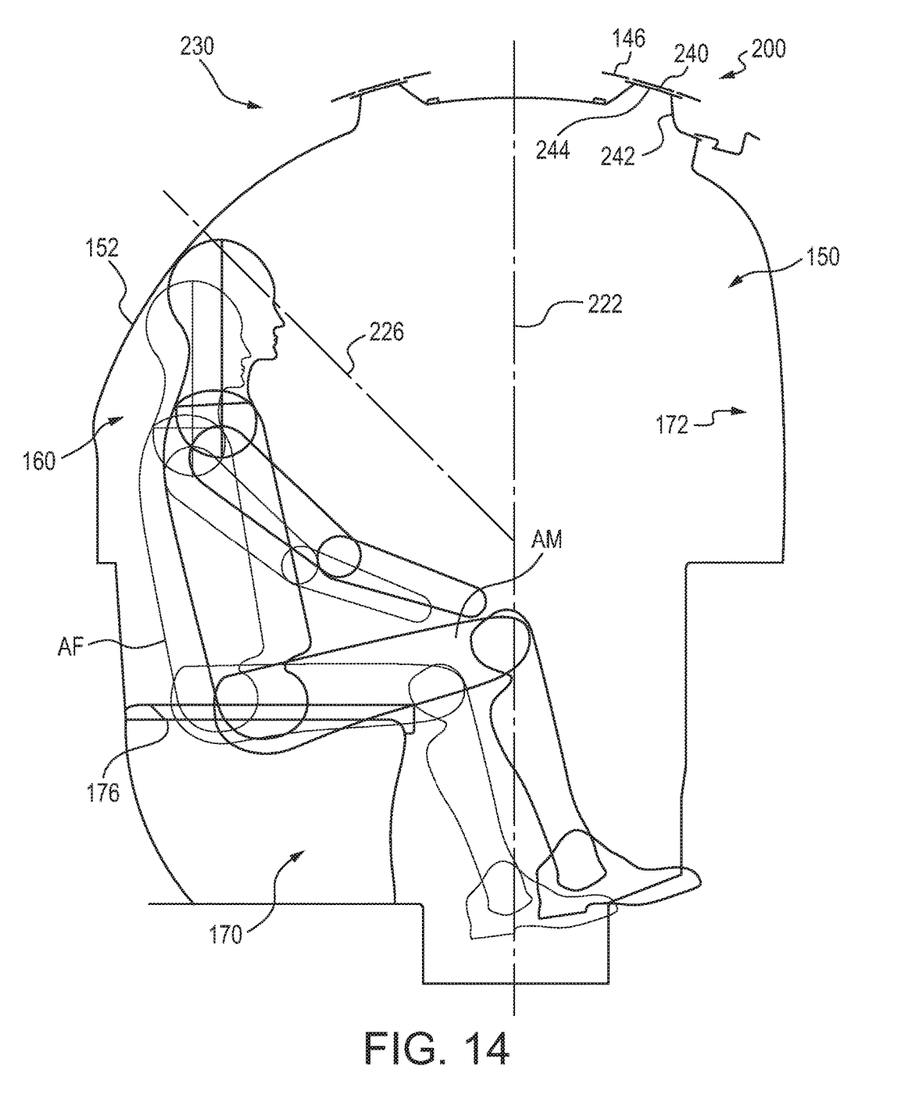

FIG. 14 depicts the lavatory area 160 with both an average sized male passenger (AM) and an average sized female passenger (AF) seated on the toilet seat 176 of the toilet 170. The first and second window assemblies 200, 230 are located at approximately 20 degree position at the upper portion of the fuselage to introduce daylight into the lavatory 150. With this location of the first and second window assemblies 200, 230, the daylight is not obstructed by a passenger seated on the toilet seat 176. The window assemblies 200, 230 introduce daylight into the lavatory area 160, and a passenger can see the outside of the aircraft 100 through either of the first and second window assemblies 200, 230. This allows the passenger to relax in the lavatory area 160 and build a sense of openness. Further, the table below shows measured light quantity (i.e., illuminance (lux)) of the lavatory area 160 at various conditions on a clear sky day. The results show that only the first and second window assemblies 200, 230 enable enough daylight intensity for the lavatory area 160 of the lavatory 150.

| Time | Location/Condition | Illuminance (lux) |
| --- | --- | --- |
| 11:29 am | Lavatory near eye level with door closed and task light off | 396 |
| 11:49 am | Lavatory near eye level with door closed and only task light on (first and second window assemblies covered) | 351 |
| 11:53 am | Lavatory near eye level with door closed (first and second window assemblies covered and task light off) | 49 |

Figure 1:
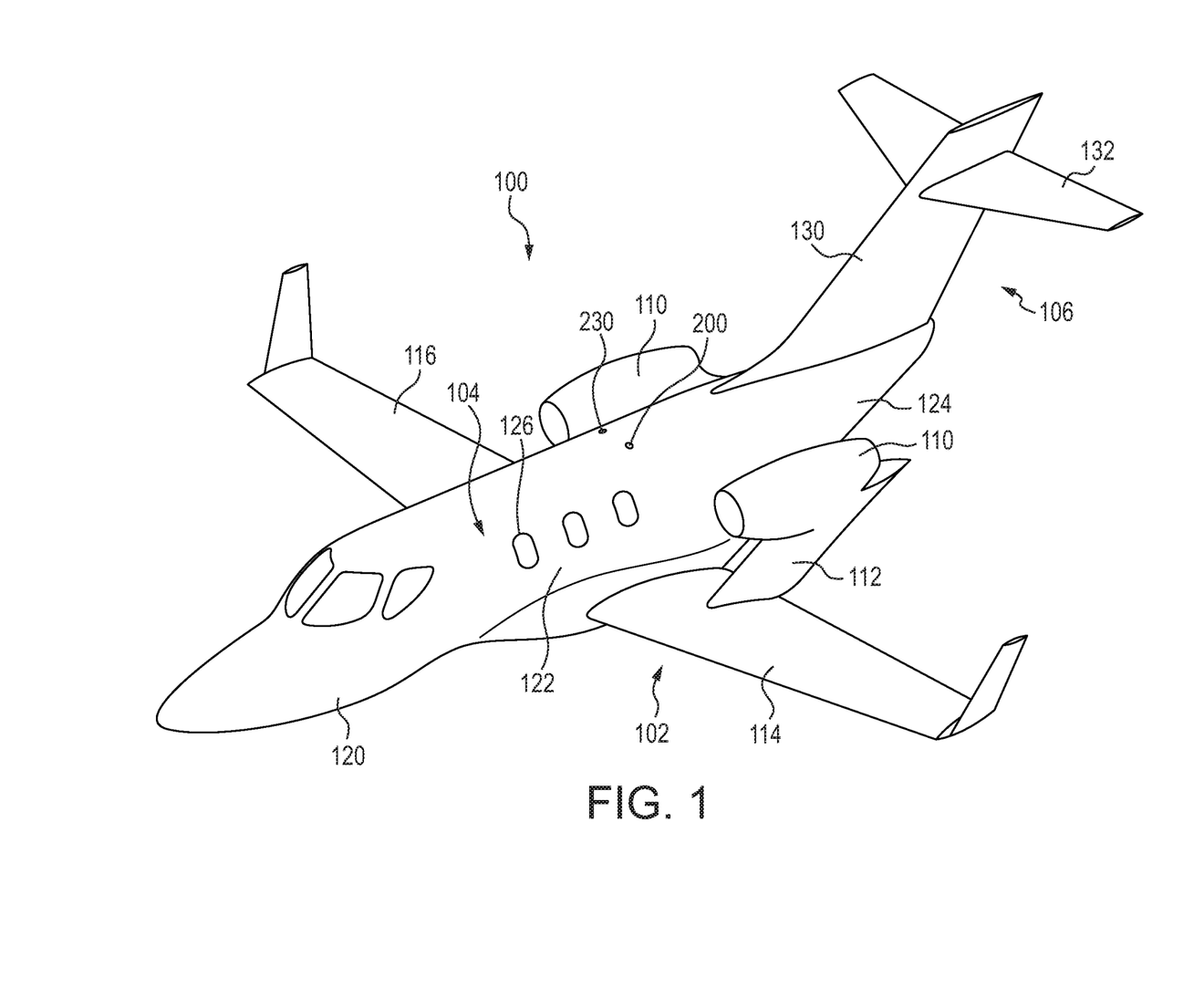
FIG. 1 is a side perspective view of an aircraft provided with a pair of exemplary window assemblies for a compartment of a fuselage, such as a lavatory.
Figure 2:
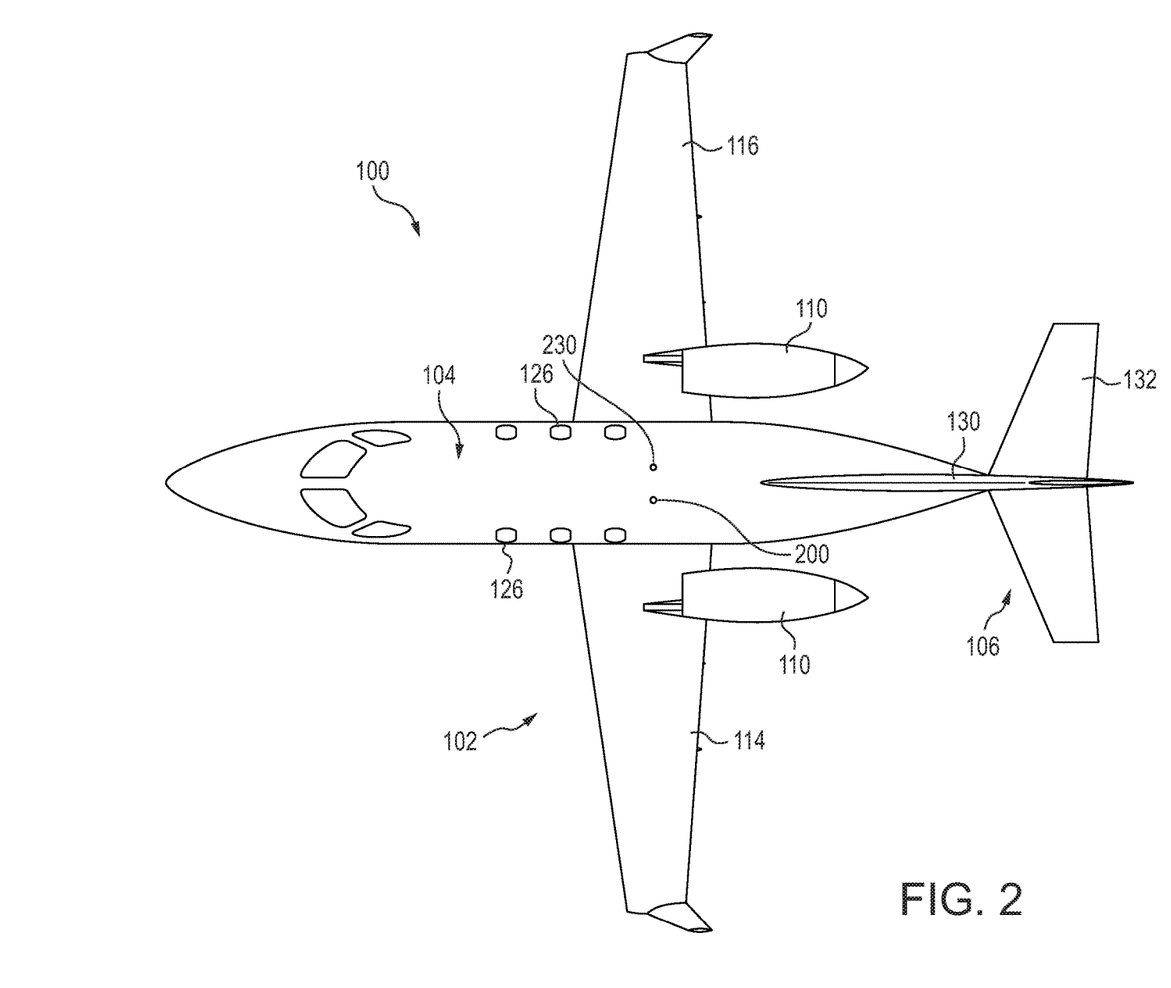
FIG. 2 is a top plan view of the aircraft of FIG. 1.
Figure 3:
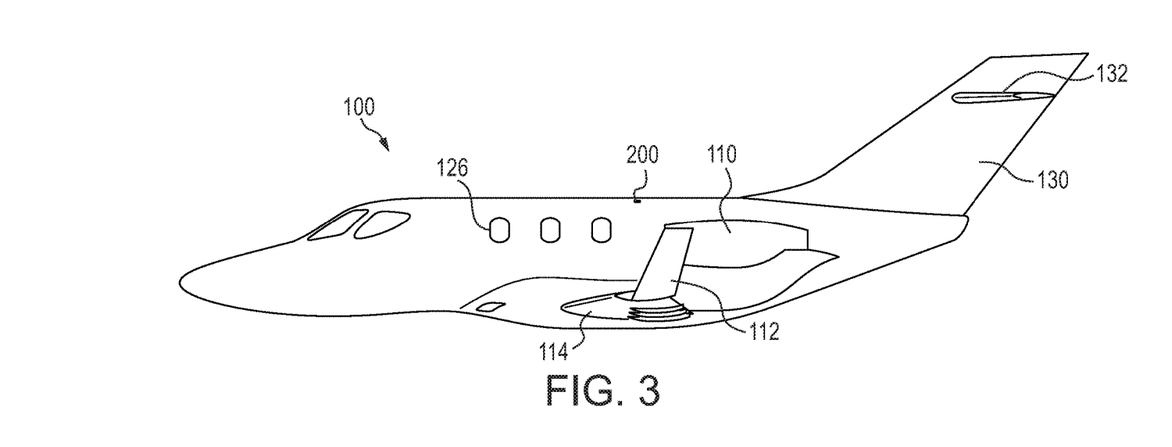
FIGS. 3 and 4 are side views of the aircraft of FIG. 1.
Figure 4:
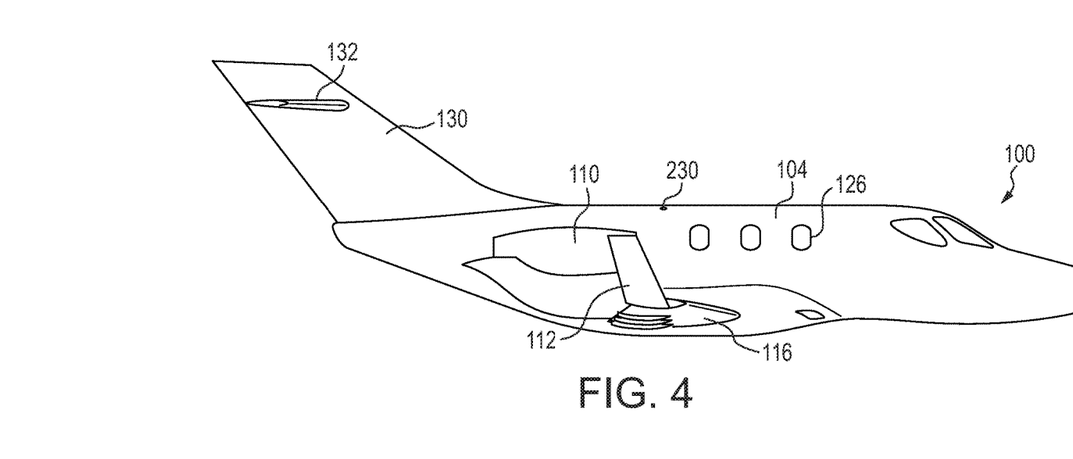
Figure 5:
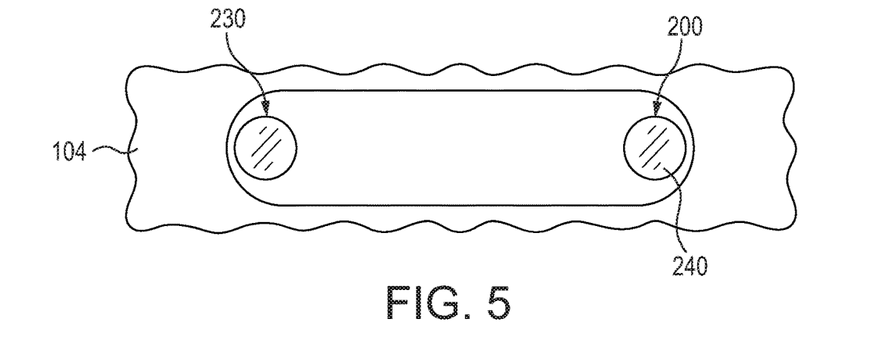
FIG. 5 is a top plan view of a portion of the fuselage showing the pair of aircraft window assemblies.
Figure 6:
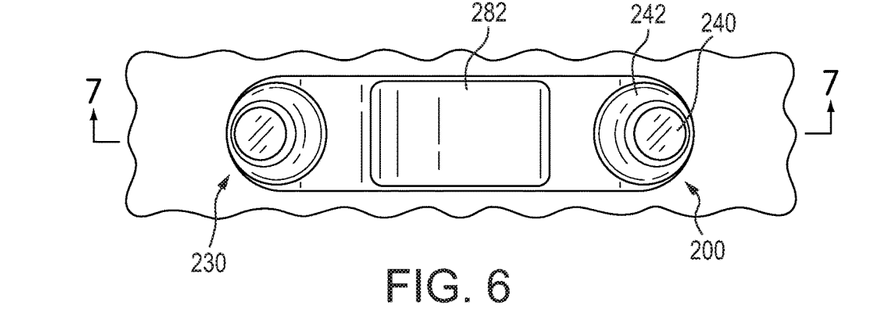
FIG. 6 is a bottom plan view of the area shown in FIG. 5.
Figure 7:
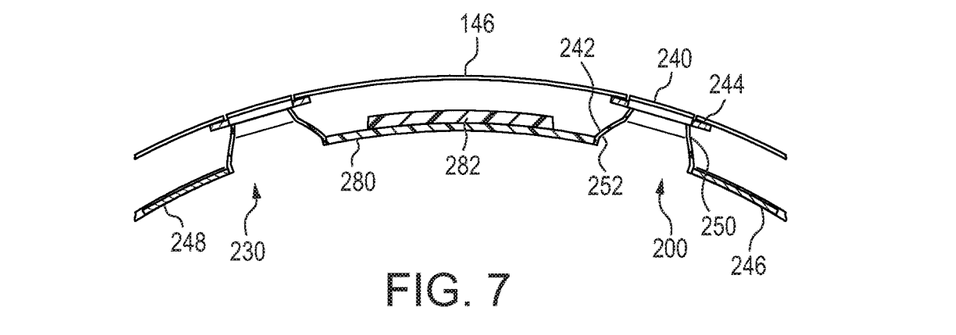
FIG. 7 is a cross-sectional view taken along line 7-7 of FIG. 6.

As stated above, in the aircraft longitudinal direction, the first and second window assemblies 200, 230 are of symmetrical design on each of the lateral sides of the longitudinal centerline 232 of the fuselage 104. Because the first and second window assemblies 200, 230 may be identically constructed, but for their disposition on opposite sides of the longitudinal centerline 232, to simplify the explanation of the present disclosure, only the features of the first window assembly 200 will be discussed below. However, it should be understood that the same construction could be used for the second window assembly 230. As shown in FIGS. 5 and 7, the first window assembly 200 includes a window pane 240, a light conduit or inner cover 242 and a retainer 244. In the depicted embodiment, the window pane 240 is circular. It should be appreciated that the shape of the window pane 240 is not limited to circular. For example, the window pane 240 may have an elliptical or rectangular shape. The edges of the window pane 240 can be processed roundly. Further, it should be appreciated that the size and shape of the window pane 140, the direction of the inner cover 242, the number and the location of the first and second window assemblies 200, 230 are appropriately decided based on various parameters such as the size of the lavatory area 160, arrangement of equipment, and lighting intensity in the lavatory area. Sliding type shades 246, 248 (schematically shown in FIG. 7) may be equipped on the first and second window assemblies 200, 230 to adjust daylight intensity.

The inner cover 242 includes a first end portion 250, which can be adapted to at least partially receive therein the window pane 240, and a second end portion 252. According to one aspect, and as depicted in FIG. 7, the outer skin 146 can include an opening sized to sealingly receive therein the window pane 240, and the first end portion 250 can be offset from the outer skin 146 of the fuselage 104. With this configuration, the window pane 240 is aligned with the first end portion 250 and the retainer 244 is configured to bridge the gap between the window pane 240 and the inner cover 242. The second end portion 252 of the inner cover opens into the lavatory area 160. The inner cover 242 serves as a reflector and defines the light quantity and light direction in the lavatory area 160, and according to one aspect, the inner cover has a frustoconical shape. This shape enables the first and second window assemblies 200, 230 to introduce much light intensity with a relatively small sized window pane 240. By way of example, the diameter of the window pane is about four inches. The inner cover 242 allows the natural light to pass towards the interior of lavatory area 160 and can be made from a plastic material or a metal such as stainless steel or aluminum, having its internal surface duly treated to facilitate sunlight reflection. As mentioned above, the present invention enables an aircraft compartment (e.g., lavatory) to let in light well with the small window pane 240, and the size of the window pane 240 gains very little or nothing by weight. Therefore, the windows pane 240 introduces enough daylight without disadvantage of gain of weight.

With reference again to FIGS. 10 and 12, the retainer 244 secures the window pane 240 to the fuselage 104. In the depicted embodiment, the retainer 244 can include a first portion 270 and second portion 272. The first portion 270 is generally plate shaped and is mounted to one of the outer skin 146 and ceiling panel 196. As shown, the retainer 244 is flanked by a pair of adjacent frame members 142 and a pair of adjacent stringers 144, and the length of the retainer 244 in circumferential direction is less than the distance of adjacent frame members or stringers. The retainer 244 is attached to the outer skin 146 via fastening devices such as bolts. However, the fastening devices may be any type of mechanical fastening device commonly known in the art, such as a rivets, etc. The second portion 272 is secured in an opening 274 located in the first portion 270 and is generally ring shaped and dimensioned to at least partially receive the first end portion 250 of the inner cover 242. It should be appreciated that the second portion 272 can be formed of a flexible material to allow for the proper orientation of the center axis of the inner cover 242 relative to the center point 228 of the lavatory area 160, and thus, the proper illumination of the lavatory area.

Figure 15:
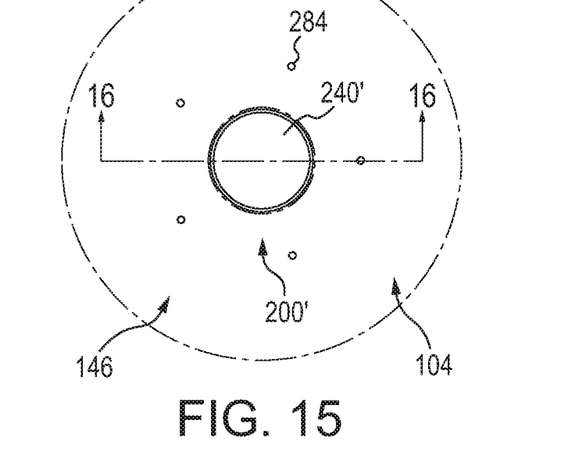
FIG. 15 is a top plan view of an exemplary window assembly for the aircraft of FIG. 1 according to another aspect.
Figure 16:
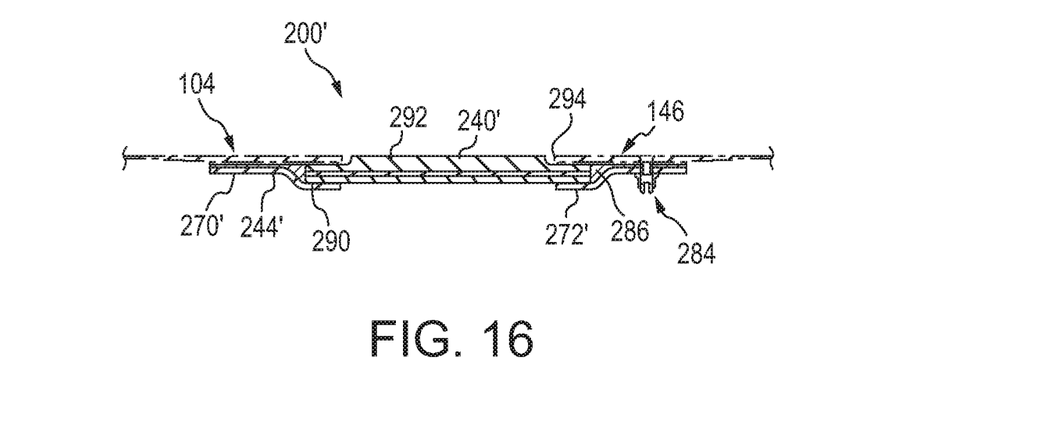
FIG. 16 is a cross-sectional view of the window assembly of FIG. 15 taken along line 16-16 of FIG. 15.

FIGS. 15 and 16 depict another aspect of a first window assembly 200'. The first window assembly 200' includes a window pane 240', a light conduit or inner cover (not shown) and a retainer 244'. Edges 290 of the window pane 240' can be processed roundly. The retainer 244' includes a first portion 270' and second portion 272'. The first portion 270' is mounted to one of the outer skin 146 and ceiling panel 196 via fastening devices 284. The second portion 272' is offset downwardly from the first portion 270' and is shaped and dimensioned to at least partially receive the edges of the window pane 240'. As shown, the edges 290 of the window pane 240' are sandwiched between the outer skin 146 and the second portion 272' of the retainer 244. A sealant 286 can be provided in a space between the window pane 240' and the retainer 244'. The window pane 240' can further include a upper portion 292 which projects at least partially through an opening 294 in the outer skin 146 of the fuselage 104 so that the window pane 240' is contiguous with the outer skin 146.

Figure 11:
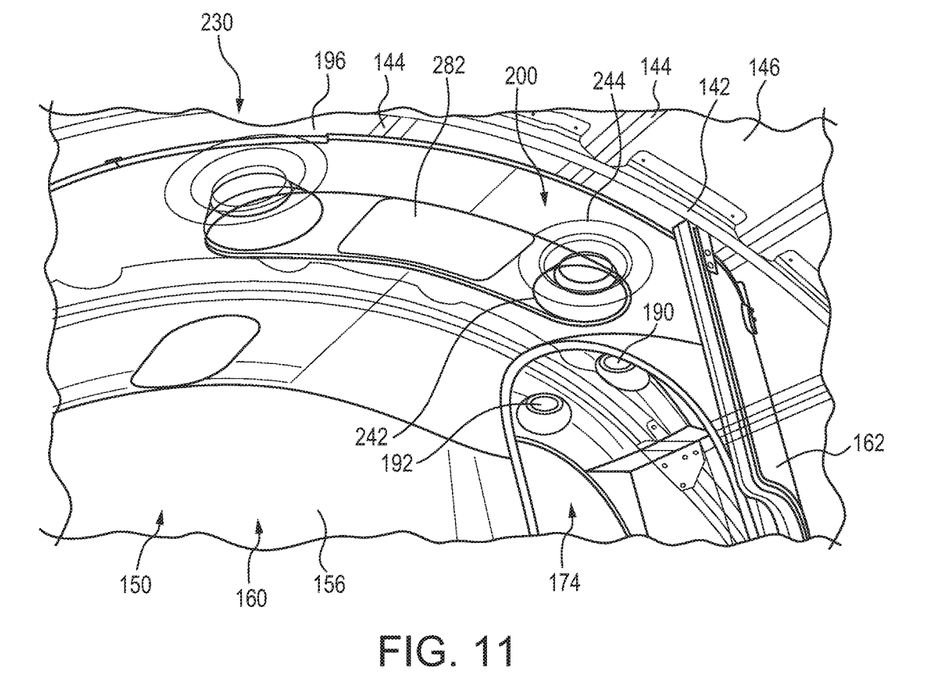
FIG. 11 is a perspective view of the lavatory area showing the pair of exemplary window assemblies.

As indicated previously, the aircraft can include the pair of window assemblies 200, 230. A support frame 280 can be secured the ceiling panel 196 and can interconnect the first and second window assemblies (FIG. 10). According to the aspect depicted in FIG. 7, the support frame can be integrally formed with one of the inner covers of the first and second window assemblies 200, 230; although, this is not required. The support frame 280 allows the first and second window assemblies 200, 230 to be easily installed on the fuselage 104 as a single unit. The support frame 280 can also be used to mount a ceiling light or fan 282 (FIG. 11). However, the use of the support frame 280 is not required and the first and second window assemblies 200, 230 can be separately installed on the fuselage 104.

It will be appreciated that the above-disclosed features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the present disclosure. For example, the first and second window assemblies 200, 230 are provided to the fuselage 104, but three or more window assemblies may be provided to the fuselage 104. The first and second window assemblies 200, 230 may be located unsymmetrically to the fuselage 104. The first and second window assemblies 200, 230 may be located at any angle from the 0 degree position to the approximately 60 degree position, though the embodiment above shows the first and second window assemblies 200, 230 are located at between the 0 degree position to the 45 degree position. The first and second window assemblies may be provided at the cockpit area and/or passenger seating area in the fuselage 104.

What is claimed is:

1. An aircraft comprising:
   a fuselage including a plurality of frame members disposed at predetermined intervals in a longitudinal direction of the fuselage and a plurality of stringers extending substantially linearly in the longitudinal direction, the fuselage defining an interior;
   a compartment located in the interior of the fuselage, the compartment defining an interior area;
   a first window assembly mounted to an upper portion of the fuselage for introducing daylight downwardly through a ceiling panel and into the interior area, the first window assembly is flanked by immediately adjacent frame members of the plurality of frame members and immediately adjacent first stringers of the plurality of stringers, the first window assembly including a first window pane, a first inner cover and a first retainer, the first inner cover introduces the daylight from the first window pane into the interior area, the first retainer secures the first window pane and the first inner cover to the fuselage; and
   a second window assembly mounted to the upper portion of the fuselage opposite the first window assembly for introducing daylight downwardly through the ceiling panel and into the interior area, the second window assembly is flanked by the same immediately adjacent frame members of the plurality of frame members and immediately adjacent second stringers of the plurality of stringers, the second window assembly including a second window pane, a second inner cover and a second retainer,
   wherein the interior area defines a lateral centerline and a vertical centerline, an intersection of the lateral and vertical centerlines defines a center point of the interior area, the first window assembly and the second window assembly are each angularly offset through the center point relative to the vertical centerline from a 0 degree position to a 60 degree position,
   wherein a support frame directly interconnects the first and second window assemblies allowing the first and second window assemblies to be mounted to the upper portion of the fuselage as a single unit, and at least one of a ceiling light and a fan is mounted to the support frame between the first and second window assemblies.

2. The aircraft of claim 1, wherein each of the first inner cover and the second inner cover has a frustoconical shape and defines a light quantity and light direction in the interior area.

3. The aircraft of claim 2, wherein the first inner cover has an inner reflective surface and includes a first end portion secured to the first retainer and a second end portion fitted in a first opening of the ceiling panel, and
   the second inner cover has an inner reflective surface and includes a first end portion secured to the second retainer and a second end portion fitted in a second opening of the ceiling panel.

4. The aircraft of claim 1, wherein edges of each of the first window pane and second window pane are rounded.

5. The aircraft of claim 1, wherein the first inner cover defines a first center axis which extends toward the center point of the interior area, and the second inner cover defines a second center axis which extends toward the center point of the interior area.

6. The aircraft of claim 1, wherein the second window assembly is laterally aligned with the first window assembly.

7. The aircraft of claim 1, wherein the first and second window assemblies have arranged symmetrical designs.

8. The aircraft of claim 1, wherein each of the first and second window assemblies includes a shade to adjust the daylight intensity.

9. The aircraft of claim 1, wherein the interior area is a lavatory space including a toilet, the toilet defines a centerline extending in a lateral direction of the fuselage, and the first and second window assemblies are equally offset in the longitudinal direction from the toilet centerline.

10. An aircraft comprising:
    a fuselage including a plurality of frame members disposed at predetermined intervals in a longitudinal direction of the fuselage and a plurality of stringers extending substantially linearly in the longitudinal direction, the fuselage defining an interior;
    a compartment located in the interior of the fuselage, the compartment defining an interior area;
    a first window assembly mounted to an upper portion of the fuselage of introducing daylight downwardly through a ceiling panel and into the interior area, the first window assembly is flanked by immediately adjacent frame members of the plurality of frame members and immediately adjacent first stringers of the plurality of stringers, the first window assembly including a first window pane, a first inner cover and a first retainer, the first inner cover introduces the daylight from the first window pane into the interior area, the first retainer secures the first window pane and the first inner cover to the fuselage, wherein the interior area is a lavatory space including a toilet and a vanity spaced from and laterally aligned with the toilet, the toilet defines a centerline extending in a lateral direction of the fuselage, and the first window assembly is mounted to an opposite side of the toilet and is offset in the longitudinal direction from the toilet centerline and the vanity, wherein the interior area defines a lateral centerline and a vertical centerline, an intersection of the lateral and vertical centerlines defines a center point of the interior area, the first window assembly is angularly offset through the center point relative to the vertical centerline from a 0 degree position to a 60 degree position.

11. The aircraft of claim 10, wherein the first inner cover defines a light quantity and light direction into the interior area.

12. The aircraft of claim 11, wherein the first inner cover has a frustoconical shape and includes a first end portion secured to the first retainer and a second end portion fitted in an opening of the ceiling panel.

13. The aircraft of claim 10, wherein edges of the first window pane are rounded.

14. The aircraft of claim 10, wherein the first window assembly includes a shade to adjust the daylight intensity.

15. The aircraft of claim 10, further including a second window assembly mounted to the upper portion of the fuselage for introducing daylight downwardly through the ceiling panel and into the interior area, the second window assembly is laterally aligned with the first window assembly, the second window assembly is flanked by the same immediately adjacent frame members of the plurality of frame members and immediately adjacent second stringers of the plurality of stringers, the second window assembly including a second window pane, a second inner cover and a second retainer.

16. The aircraft of claim 15, further including a support frame directly interconnecting the first and second window assemblies allowing the first and second window assemblies to be installed on the upper portion of the fuselage as a single unit.

17. The aircraft of claim 15, wherein the first and second window assemblies are equally offset in the longitudinal direction from the toilet centerline.

18. The aircraft of claim 15, further including passenger windows mounted to a side portion of the fuselage.

* * * * *